United States Patent [19]

Sopori

[11] Patent Number: 5,217,285
[45] Date of Patent: Jun. 8, 1993

[54] APPARATUS FOR SYNTHESIS OF A SOLAR SPECTRUM

[75] Inventor: Bhushan L. Sopori, Denver, Colo.

[73] Assignee: The United States of America as represented by United States Department of Energy, Washington, D.C.

[21] Appl. No.: 670,112

[22] Filed: Mar. 15, 1991

[51] Int. Cl.$^5$ .............................................. F21V 5/02
[52] U.S. Cl. .......................................... 362/1; 362/2; 362/32; 362/231; 362/293
[58] Field of Search .................. 362/1, 2, 32, 231, 293

[56] References Cited

U.S. PATENT DOCUMENTS

| | | |
|---|---|---|
| 3,185,834 | 5/1965 | Thelen et al. |
| 3,247,367 | 4/1966 | Rayces ........................ 362/1 |
| 3,336,835 | 8/1967 | Evensen et al. |
| 3,757,106 | 9/1973 | Bau et al. |
| 3,825,336 | 7/1974 | Reynolds ..................... 362/32 |
| 4,048,486 | 9/1977 | Kriege ......................... 362/32 |
| 4,071,809 | 1/1978 | Weiss et al. |
| 4,206,494 | 6/1980 | Lovering ..................... 362/32 |
| 4,380,791 | 4/1983 | Nishizawa ................... 362/32 |
| 4,454,570 | 6/1984 | Morello |
| 4,488,207 | 11/1984 | Harmon |
| 4,535,394 | 8/1985 | Dugre |
| 4,636,036 | 1/1987 | Pasquali |
| 4,641,227 | 2/1987 | Kusuhara |
| 4,758,950 | 7/1988 | Pomares ...................... 362/32 |
| 4,789,989 | 12/1988 | Stern et al. ................. 362/32 |
| 4,815,815 | 3/1989 | Mori ............................. 362/32 |
| 4,839,779 | 6/1989 | Kasboske |
| 4,932,747 | 6/1990 | Rossell et al. .............. 362/32 |
| 4,933,813 | 6/1990 | Berger ......................... 362/2 |
| 5,031,078 | 7/1991 | Bornhorst .................... 362/32 |

OTHER PUBLICATIONS

B. L. Sopori, A Spectral Response Measurement System for Large-Area Solar Cells, Solar Cells, vol. 22, pp. 287-294 (1987).

B. L. Sopori et al., Mixing Optical Bems for Solar Simulation—A New Approach, (May 21-25 1990).

*Primary Examiner*—Richard R. Cole
*Attorney, Agent, or Firm*—Kenneth Richardson; James W. Weinberger; William R. Moser

[57] ABSTRACT

A xenon arc lamp and a tungsten filament lamp provide light beams that together contain all the wavelengths required to accurately simulate a solar spectrum. Suitable filter apparatus selectively direct visible and ultraviolet light from the xenon arc lamp into two legs of a trifurcated randomized fiber optic cable. Infrared light selectively filtered from the tungsten filament lamp is directed into the third leg of the fiber optic cable. The individual optic fibers from the three legs are brought together in a random fashion into a single output leg. The output beam emanating from the output leg of the trifurcated randomized fiber optic cable is extremely uniform and contains wavelengths from each of the individual filtered light beams. This uniform output beam passes through suitable collimation apparatus before striking the surface of the solar cell being tested. Adjustable aperture apparatus located between the lamps and the input legs of the trifurcated fiber optic cable can be selectively adjusted to limit the amount of light entering each leg, thereby providing a means of "fine tuning" or precisely adjusting the spectral content of the output beam. Finally, an adjustable aperture apparatus may also be placed in the output beam to adjust the intensity of the output beam without changing the spectral content and distribution of the output beam.

12 Claims, 4 Drawing Sheets

APPARATUS FOR SYNTHESIS OF A SOLAR SPECTRUM

CONTRACTUAL ORIGIN OF THE INVENTION

The United States Government has rights in this invention under Contract No. DE-AC02-83CH10093 between the U.S. Department of Energy and the Solar Energy Research Institute, a Division of Midwest Research Institute.

BACKGROUND OF THE INVENTION

1. Field of the Invention

This invention relates to solar simulators in general, and more particularly to a solar simulator having an accurate output spectrum of extreme uniformity and that is easily adjusted to produce a variety of desired solar spectra.

2. Brief Description of the Prior Art

Solar simulators are light source devices for reproducing the spectral distribution of natural sunlight As such, solar simulators have proven indispensable in evaluating various devices using solar energy, such as, for example, the photoelectric conversion properties of solar cells. Typically, the solar cell being evaluated or tested is illuminated by the output light beam produced by the solar simulator. The voltage and current parameters of the cell as well as the overall conversion efficiency of the cell are then measured and determined Since solar cells are designed for a number of different applications, that is, some cells are designed to operate in space while others are designed to operate on the surface of the earth, there is a need to evaluate the performance of each type of cell using the same solar spectrum in which it is designed to operate. For example, the spectral distribution of light from the sun in space is not the same as the spectral distribution after the light has passed through the earth's atmosphere. More specifically, sunlight in space contains more infrared and ultraviolet radiation than does sunlight incident on the surface of the earth. Accordingly, several standardized solar spectra have been developed for sunlight in various places and under various conditions. The standard reference spectrum of sunlight in space is usually referred to as the AM0 spectrum. Similarly, the AM1.5 spectrum identifies the solar spectrum on an average sunny day while the AM2 spectrum designates that solar or sun spectrum found on the surface of the earth at sea level. Therefore, to accurately test solar cells designed for use in space requires a solar simulator that can accurately reproduce the AM0 spectrum. Cells designed to work on earth should be tested using the AM1.5 or AM2 spectra.

Several different systems have been used in the past to produce output beams that approximate these various solar spectra. Principal among them are single and dual source solar simulators. The single source simulators generate their light outputs from the light produced by a single light source. Dual, or twin source models, on the other hand, utilize the light produced by two light sources to approximate the desired solar spectrum. Designers of systems employing both technologies are continually attempting to improve the simulators. Performance issues of particular importance include accuracy of the reproduced spectrum as compared to a standard spectrum (i.e., either AM0, AM1.5, or AM2), light output or intensity (brightness) capability, good beam uniformity, overall light efficiency, and size. Ease of manufacture and cost are also important considerations.

The single source simulators produce output beams from single light sources only, typically xenon arc lamps. High brightnesses and beam uniformities are usually easily obtained with such single source systems, but it is difficult to accurately reproduce a given standard solar spectrum, such as AM0, AM1.5, or AM2, because the light produced by the xenon arc lamps contains fairly strong intensity peaks in the near infrared region that are not found in any of the standard solar spectra. Although improvements have been made in the infrared portion of the spectra produced by such simulators by using various types of filters, there are still fundamental limits to the accuracy of the spectral distribution produced using only one source. Another drawback associated with such systems is that it is difficult to modify the spectral distributions of the output beams to reproduce one of the other standardized spectra. For example, it is relatively difficult to modify an AM0 simulator to accurately reproduce the AM1.5 spectrum. Usually, such modification requires numerous filter changes, and may possibly require that the light source be driven at a different intensity to reproduce the desired solar spectrum. Such single source simulators were, however, usually sufficient for evaluating the older, first generation of single junction solar cells.

Unfortunately, recent advances in solar cell technology and the development of highly efficient multijunction (MJ) solar cells are placing increasing demands on the testing procedures used to evaluate solar cells. For example, it is now well recognized that the current and voltage characteristics of an illuminated solar cell are strongly influenced by the spectral distribution of the light beam produced by the solar simulator. In fact, the measured efficiency of a typical advanced multijunction (MJ) solar cell can vary by as much as 20% when illuminated by supposedly identical solar simulators. This large variation in measured cell efficiency is due to the spectral mismatch between the simulators, even though each is supposed to accurately reproduce the same standardized spectrum. Obviously, such large variations in measured cell performance hinders further development and improvement of solar cells, since it is difficult to determine which cell performance data best represent the true performance of the cell. In short, it has been found that currently available single source solar simulators cannot adequately match the standardized solar spectra required for advanced MJ cell testing regardless of the numbers and complexities of the filters added to the simulators. Put in other words, while such single source solar simulators were generally acceptable for testing single junction solar cells, they have proven almost completely useless in testing the new advanced and highly efficient multijunction (MJ) cell designs.

The so-called dual source simulators were developed in attempts to minimize the performance measurement errors caused by the spectral mismatch found in single source simulators. The dual source solar simulators combine the light beams produced by two different sources and have shown some promise in better approximating the spectral distribution of the particular solar spectrum that they are designed to reproduce. Typically, such dual source systems still utilize a xenon arc lamp to produce the visible and ultraviolet portions of the spectrum. However, the dual source simulators add a tungsten filament lamp to produce the infrared portion of the solar spectrum. Accordingly, the dual source systems have provided some improvement in the suppression of the near infrared emission lines in the output light by replacing the undesirable infrared light from the xenon lamp with the infrared light produced by the tungsten source, which has a much better spectral distribution in the near infrared region. Unfortunately, while the dual source systems usually provide better spectral accuracy, they usually suffer from output beam nonuniformity as well as reduced efficiency. Also, since two light sources are used, there is usually some change or drift in the spectral distribution of the output beam as the two individual sources age and their output spectra change. Like the single source systems, it is usually difficult to modify a given dual source system to reproduce one of the other standardized spectra. Also, it is even more difficult to vary the intensity of the output beam of a typical dual source system than for a single source system, because the intensities of both light sources must be changed. Obviously, changing the intensity of a tungsten source usually results in a change in the output spectrum from that source, therefore requiring additional filters to bring the spectral distribution of the output beam back to its original configuration.

A fairly recent dual source solar simulator is disclosed in the Kusuhara patent, U.S. Pat. No. 4,641,227, issued on Feb. 3, 1987. Essentially, Kusuhara's simulator includes a dichroic beam splitter to remove the near infrared component from the spectrum of the light produced by the xenon arc lamp while simultaneously extracting the near infrared component from the spectrum of the light produced by the tungsten filament lamp and combining it with the light emitted by the xenon arc lamp minus the previously filtered near infrared component. An optical integrator integrates the spectra from the two beams and projects them as a single beam onto the device being tested. Kusuhara's system also includes relatively complex apparatus to vary the intensity of the output beam by changing the distance of the tungsten source from the dichroic mirror and by controlling the electric current supplied to the xenon arc lamp. Thus, by changing the position of the tungsten source, as opposed to changing its intensity, Kusuhara avoids changing the spectral distribution of the light produced by the tungsten lamp, thereby eliminating the need to change the filters. The position of the tungsten source and the current supplied to the xenon arc lamp are synchronously controlled thereby keeping the ratio between the intensities of the light beams from the two light sources substantially equal as the intensity is varied.

While the system disclosed by Kusuhara represents an improvement over the prior dual and single source solar simulators, it still has some disadvantages. For instance, the relatively large dichroic beam splitter used to filter out the near infrared portion from the xenon beam and combine the near infrared beam from the tungsten filament source is expensive and may suffer discontinuities over its surface, thereby causing nonuniformities in the output beam. Further, while the spectrum produced by Kusuhara's twin source simulator is better than that obtainable with single source systems, current research indicates that the use of two sources still does not provide sufficient flexibility to reproduce a desired solar spectrum with an accuracy necessary to provide accurate performance measurements on advanced solar cell designs. Kusuhara's system does not readily lend itself to the addition of additional light sources to better approximate the desired solar spectrum, nor is it easy to change the spectral distribution of the output beam to reproduce one of the other standardized spectra. Also, the complex intensity control apparatus increases the overall cost of the system and introduces yet more complexity. Finally, the power transmission efficiency of Kusuhara system is relatively low, with a significant amount of power being absorbed by the relatively large optical elements and dichroic beam splitter, thus possibly requiring the use of external cooling systems when used at high power levels.

Since these dual source systems still are not capable of accurately reproducing a desired solar spectrum, the testing of the new, multijunction solar cells is still very difficult and tedious. For example, a commonly used testing method for single or dual source simulators involves adjusting the solar simulator until the short circuit current of a known solar cell (i.e., a reference cell) is equal to its calibrated value for a given set of reference conditions, such as temperature, total irradiance, and spectral irradiance. Usually, the reference cell chosen should have a spectral response very similar to the expected response of the new cell being tested to reduce spectral mismatch errors. Unfortunately, reference cells do not exist for many of the advanced multijunction photovoltaic devices currently being developed and tested. Accordingly, errors are introduced into the performance figures by spectral mismatch that cannot always be corrected. For example, for two terminal multijunction devices, performance parameters such as fill factor and efficiency are closely related to the spectral content of the light incident on the cell. Even after making corrections for spectral mismatch, the accuracy in the measurements made with the current simulators is limited to about 5% for single junction cells and as high as 20% for multijunction cells.

Therefore, there remains a need for a solar simulator that can accurately reproduce a desired solar spectrum at a number of different brightness levels while maintaining a constant spectral distribution and good beam uniformity. Ideally, the spectral distribution of the output light beam of such a system should be easily adjustable to reproduce any of the three standardized solar spectra. Such a simulator should also be very efficient, low power consuming, and relatively inexpensive and easy to manufacture. Further, such a system should contain a minimum number of large, difficult to manufacture, and expensive components, so as to minimize changes in the spectral distribution of the output beam as the components age. Such a system should also minimize the use of expensive quartz elements necessary to transmit the ultraviolet wavelengths of the reproduced spectrum. The solar simulator should be able to combine the light generated by three or even more sources to even more accurately reproduce the desired spectral distribution. Prior to this invention, no such solar simulators existed.

SUMMARY OF THE INVENTION

Accordingly, it is a general object of this invention to provide simulator apparatus capable of accurately reproducing a desired spectral distribution.

It is another general object of this invention to provide a solar simulator where the spectral distribution of the output beam can be easily adjusted to produce a wide variety of different spectral distributions.

It is still another general object of this invention to provide a solar simulator where the intensity of the output beam can be easily adjusted without changing the spectral distribution of the output beam.

It is yet another general object of this invention to provide a solar simulator with improved throughput and intensity, yet with less power consumption and heat generation.

It is still yet another general object of this invention to provide a solar simulator having improved spectral accuracy and performance, but yet being capable of low cost manufacturing.

It is a further object of this invention to provide a solar simulator having an exceptionally uniform output beam.

It is a more specific object of this invention to provide a solar simulator having multiple light sources, the relative contributions of which can be independently adjusted to vary the spectral distribution of the output beam.

It is another more specific object of this invention to provide a solar simulator that can combine the light generated by multiple sources without the need for inefficient and expensive dichroic beam splitters.

It is still another object of this invention to provide a solar simulator that minimizes the number of expensive quartz optical elements.

Additional objects, advantages, and novel features of the invention shall be set forth in part in the description that follows, and in part will become apparent to those skilled in the art upon examination of the following or may be learned by the practice of the invention The objects and the advantages of the invention may be realized and attained by means of the instrumentalities and in combinations particularly pointed out in the appended claims.

To achieve the foregoing and other objects and in accordance with the purpose of the present invention, as embodied and broadly described herein, the solar simulator apparatus of this invention includes at least two light sources for providing three light beams that together contain all the wavelengths required to accurately simulate a desired standardized solar spectrum. The most commonly used light sources are xenon arc lamps and tungsten filament lamps. Suitable filter apparatus selectively extract visible and ultraviolet light from the xenon arc lamp, forming two separate beams. These two beams are then directed into two optic fiber legs of a trifurcated randomized fiber optic cable. Infrared light selectively filtered from the tungsten filament lamp is directed into the third leg of the fiber optic cable. The individual optic fibers from the three legs are brought together in a random fashion into a single output leg. The output beam emanating from the output leg of the trifurcated randomized fiber optic cable is, therefore, extremely uniform and contains wavelengths from each of the three individual light beams. This uniform output beam passes through suitable collimation apparatus before striking the surface of the solar cell being tested.

Three individual adjustable aperture apparatus located in the paths of the three beams before the beams enter the input legs of the trifurcated fiber optic cable can be selectively adjusted to limit the amount of light entering each leg, thereby providing a means of "fine tuning" or adjusting the spectral content of the output beam. Finally, a fourth adjustable aperture apparatus may also be placed in the output beam before the collimation apparatus to adjust the intensity of the output beam without changing the spectral distribution and uniformity of the output beam.

BRIEF DESCRIPTION OF THE DRAWINGS

The accompanying drawings, which are incorporated herein and form a part of the specification, illustrate preferred embodiments of the present invention, and together with the description, serve to explain the principles of the invention. In the drawings.

DETAILED DESCRIPTION OF THE PREFERRED EMBODIMENT

Figure 1:
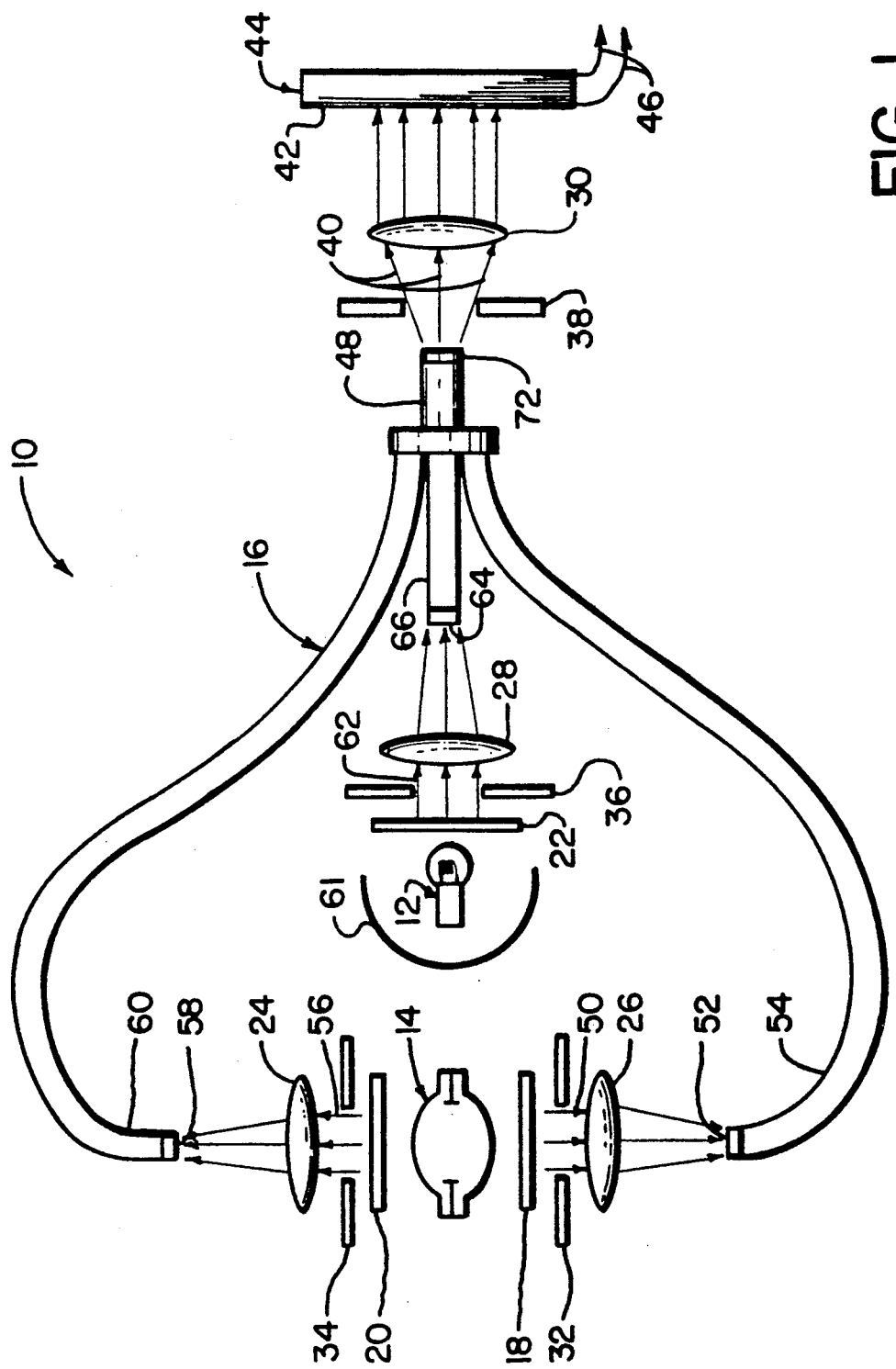
FIG. 1 is a schematic plan view of the preferred embodiment of the apparatus for the synthesis of a solar spectrum according to the present invention showing the trifurcated fiber optic cable, the two light sources, the adjustable aperture apparatus, and various lenses and filters.

The solar simulator 10 according to the present invention is shown in FIG. 1 and includes a tungsten filament lamp 12, a xenon arc lamp 14, and a randomized, trifurcated fiber optic cable 16, along with a number of filters 18, 20, and 22, lenses, 24, 26, 28, and 30, and adjustable apertures 32, 34, 36, and 38, as will be described in detail below. Briefly, xenon arc lamp 14 produces a relatively complete spectrum comprising infrared, visible, and ultraviolet light. However, the light produced by the arc lamp alone is not suitable for accurately reproducing any of the standard solar spectrums (i.e., AM0, AM1.5, or AM2). A filter 18 and glass lens 26 together substantially remove the infrared and ultraviolet components of the light to produce a light beam 50 substantially comprising light of visible wavelengths, as will be described later. This visible light beam 50 is focused onto the end 52 of a leg 54 of a randomized, trifurcated fiber optic cable 16. In a similar manner, filter 20 removes the infrared and visible portions of the light produced by xenon lamp 14, leaving ultraviolet beam 56 that is focused onto the end 58 of leg 60 of fiber optic cable 16. Light from a tungsten filament lamp 12 passes through filter 22, leaving an infrared beam 62 that is then focused onto the end 64 of leg 66 of fiber optic cable 16. The optic fibers from each leg 54, 60, and 66 of cable 16 are brought together in a random distribution to form output leg 48, as will be described below. The output beam 40 projected from this output leg 48 has a spectral distribution that is the sum of the spectral distributions from the visible beam 50, the ultraviolet beam 56, and the infrared beam 62. This output beam 40 is collimated by lens 30 and strikes the surface 42 of the solar cell 44 being tested. The voltage and current generated by the cell 44 are then measured via output leads 46 by suitable testing apparatus (not shown).

The primary advantage in using the randomized, trifurcated fiber optic cable 16 is that it can easily produce a uniform output beam having a substantially homogeneous mix of the light from each of the three beams. In the preferred embodiment, the diameter of each of the fibers is extremely small, typically in the range of about 50 micrometers, and each leg contains several thousand of these tiny optic fibers to collect and transmit the light from the three source beams. The individual fibers from each of the three legs are then brought together in a random fashion into a single output bundle or leg 48. Since the diameter of each fiber in the output leg 48 of fiber optic cable 16 is small, and since it contains a large number of such fibers, the output beam 40 is of exceptionally high uniformity (greater than 99% uniform), as will be described in detail below. Further, since the solar simulator 10 according to the present invention does not require dichroic beam splitters to combine the beams, coupling inefficiencies are greatly reduced. In fact, very high throughput is achieved according to the present invention, since the fiber optic cable provides coupling efficiencies of about 80%. Most importantly, a very high degree of spectral accuracy is possible, not only because of the ability of the present invention to combine light from several sources, but because the intensity of each beam can be easily controlled by adjusting the variable apertures 32, 34, and 36 in each individual beam, as will be fully described below.

Figure 2:
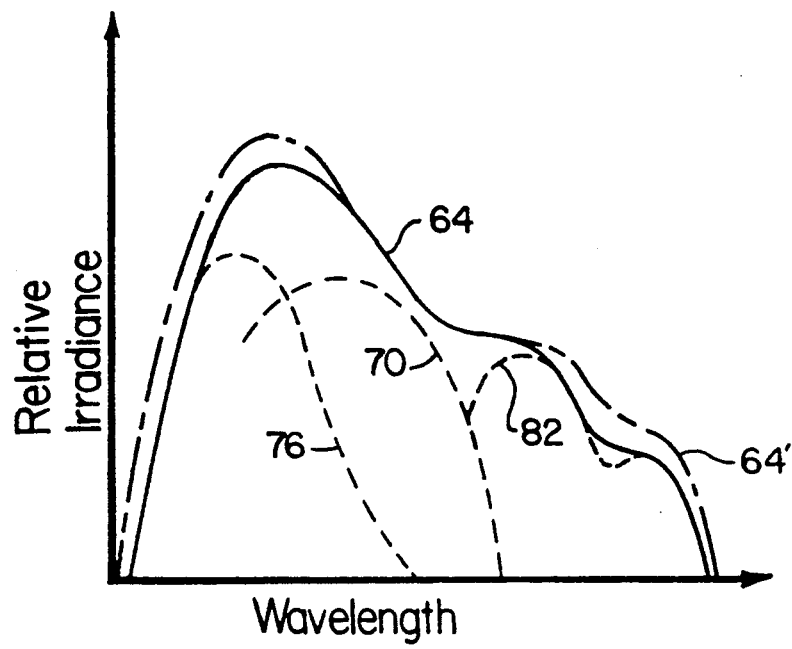
FIG. 2 is a graph of the relative irradiance vs. wavelength of the output beam simulating a typical solar spectrum and how a number of individual beams having differing spectra can be combined to produce the output beam having a desired spectral distribution.
Figure 3:
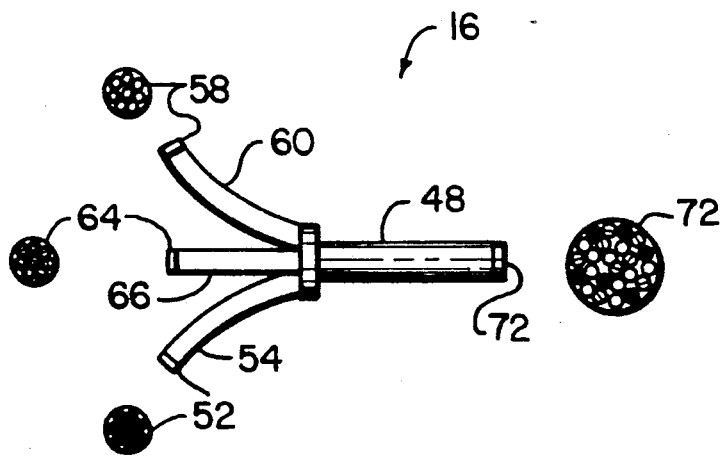
FIG. 3 is a schematic view of the randomized trifurcated fiber optic cable according to the present invention showing how the individual optic fibers from each leg are randomized in the output bundle or leg.

Referring now to FIGS. 1, 2, and 3 simultaneously, a detailed description of the preferred embodiment 10 of the solar simulator is provided by following the paths of the individual beams from the light sources to the surface 42 of solar cell 44. As was briefly mentioned above, light produced by xenon arc lamp 14 includes visible and ultraviolet portions that very nearly approximate the visible and ultraviolet components in a typical solar spectrum. However, as is well known, the infrared light produced by xenon arc lamps is not suitable when attempting to accurately reproduce the solar spectrum. Accordingly, the infrared light from xenon lamp 14 is not used. Filter 18 removes the infrared light to produce beam 50, which now includes light comprising visible wavelengths as well as ultraviolet wavelengths. This beam 50 then passes through an adjustable or variable aperture 32 that can be selectively adjusted to vary the amount of light from beam 50 that ultimately enters the end 52 of fiber optic cable 16. An ordinary glass lens 26 focuses the beam 50 onto the end 52 of leg 54 of cable 16 Since glass absorbs ultraviolet radiation, glass lens 26 effectively removes the ultraviolet wavelengths from beam 50, leaving only visible wavelengths. This visible light is then carried by leg 54 to output leg 48, where it emerges to form part of output beam 40.

In a similar manner, filter 20 removes the infrared and visible wavelengths from the light produced by lamp 14, leaving an ultraviolet beam 56. This ultraviolet beam 56 then passes through adjustable or variable aperture 34 before being focused by a quartz lens 24 onto the end 58 of leg 60 of trifurcated cable 16. Since beam 56 comprises ultraviolet light, lens 24, as well as the optic fibers in leg 60, must be quartz glass, so that the ultraviolet light is not absorbed. The ultraviolet light is then carried by leg 60 to output leg 48, where it emerges to form the ultraviolet component of output beam 40. Thus, since only one leg of the fiber optic cable 16 need be made of quartz fibers to transmit the ultraviolet light, the overall cost of the cable 16 is reduced, because the remaining legs can be fabricated of less expensive glass fibers.

Finally, suitable infrared light is obtained from tungsten filament lamp 12, which produces infrared and near infrared light having wavelengths and intensities that very closely approximate those produced by the sun. Reflector 62 collects the light produced by lamp 12 and directs it through filter 22, which removes all but the desired infrared and near infrared wavelengths to produce infrared beam 62. Here again, a variable aperture 36 selectively regulates the amount of light striking glass lens 28 and entering the end 64 of leg 66 of trifurcated cable 16. The infrared light is then carried by leg 66 to output leg 48 to form the infrared portion of output beam 40.

Output beam 40 now comprises visible light from beam 50, ultraviolet light from beam 56, and infrared light from beam 62, and is directed through variable aperture 38 and quartz lens 30, before striking the surface 42 of solar cell 44. Advantageously, the final output spectrum 64 (FIG. 2) of beam 40 can be easily tailored or "fine tuned" by adjusting the appropriate variable aperture 32, 34, or 36, to increase or decrease the relative amounts of light from beams 50, 56, or 62. Put in other words, each light beam 50, 56, and 62 is comprised of light of a number of different wavelengths within a certain band, forming a spectrum. Referring now to FIG. 2, visible light beam 50 has a visible spectrum 70, ultraviolet light beam 56 has an ultraviolet spectrum 76, and infrared beam 62 has an infrared spectrum 82, as shown in broken lines in FIG. 2. Therefore, if output beam 40 is currently reproducing the AM1.5 spectrum, it can be easily altered to simulate the AM0 spectrum (i.e., the solar spectrum in space having increased ultraviolet and infrared components), by opening both ultraviolet aperture 34 and infrared aperture 36 to increase the relative intensities of the respective spectrums 76 and 82 (FIG. 2). The spectral distribution 64' of output beam 40 will then contain increased ultraviolet and infrared components, as shown in phantom lines in FIG. 2.

Therefore, by selectively changing the variable apertures 32, 34, and 36, the light sources 12 and 14 can always be driven at the same intensities, thereby eliminating any changes in the spectral distributions in the light produced by each lamp and also eliminating the need for additional control circuitry to vary the intensities of the lamps or change their relative positions. Moreover, any changes in the spectral distributions of the light produced by either of the sources 12 or 14 due to aging can be easily compensated by adjusting the variable apertures to return the spectral distribution 64 of output beam 40 back to its original shape. These variable apertures also allow the solar simulator 10 of this invention to produce a more accurate spectral distribution than was obtainable with the prior art dual source simulators even though the simulator of the present invention also only uses two sources, because the intensities of the three individual light beams 52, 56, and 62 produced by the two light sources can be independently controlled to fine tune the spectral distribution of the output beam 40. Finally, the fourth variable aperture 38 placed in output beam 40, between lens 30 and output leg 48, can be adjusted to vary the overall intensity of the light falling on the surface of cell 42 without altering the spectral distribution 64 of output beam 40.

The details of the randomized, trifurcated fiber optic cable 16 are best seen in FIG. 3. Essentially, cable 16 comprises three individual legs 54, 60, and 66 that are brought together to form a single output leg 48. In the preferred embodiment, each leg 54, 60, and 66 comprise about 4,000 individual optical fibers, with each fiber having a diameter of about 50 micrometers. The fibers can be ordinary glass fibers, but the fibers in the ultraviolet leg 60 must be of quartz glass, or some other material that will transmit ultraviolet radiation. Actually, in the preferred embodiment, the ultraviolet leg 60 comprises only about 20% quartz fibers, with the remaining fibers being ordinary glass fibers, since it is not necessary for the preferred embodiment to transmit large amounts of ultraviolet light. While the glass fibers do not transmit any of the ultraviolet light, such glass fibers do serve to increase the diameter of leg 60 to enhance coupling efficiency. Of course, if a particular application requires that large amounts of ultraviolet light be transmitted by leg 60, then leg 60 could be made entirely of quartz glass fibers. Each of the fibers from each leg are then brought together in output leg in a random fashion, so that the end 72 (shown in cross section in FIG. 3, along with cross section views of ends 52, 58, and 64) of output leg 48 contains all the fibers from each of the legs, but randomly mixed throughout. Therefore, the output end 72 of output leg 48 comprises some 12,000 individual fibers, all contained within a relatively small diameter of about 1.25 cm. The very large number of tiny light sources concentrated over such a small diameter results in an extremely uniform mix of the light from each leg. An additional advantage of the small diameter of output leg 48 is that a relatively small, thus, inexpensive, quartz lens 30 (FIG. 1) can be used to collimate the infrared, visible, and ultraviolet portions of beam 40 onto the surface 42 of solar cell 44.

Figure 4:
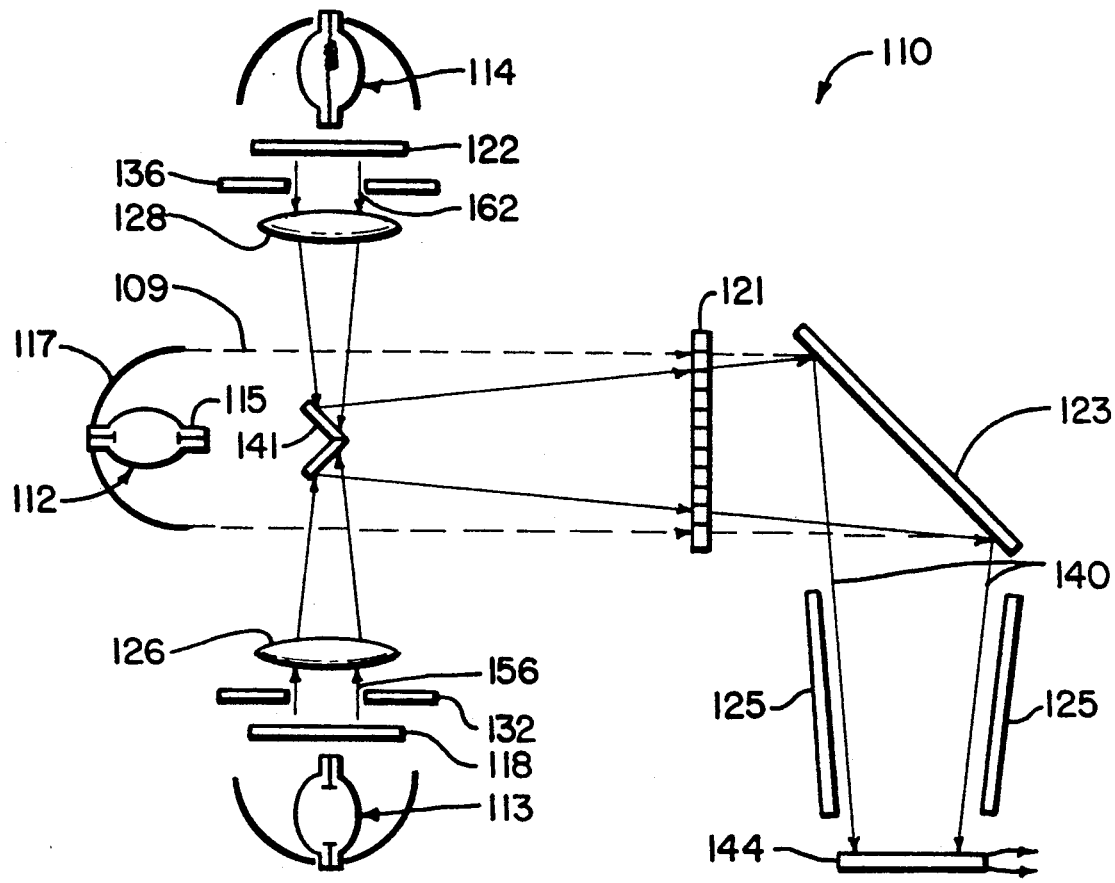
FIG. 4 is a schematic plan view of a second embodiment of the solar simulator according to the present invention not using the trifurcated fiber optic cable, but utilizing a primary light source and two secondary light sources.

A second embodiment 110 of a solar simulator according to the present invention is shown in FIG. 4. This second embodiment 110 is better suited than the first embodiment 10 for producing an output beam 140 having a relatively large cross section. Such a larger output beam 140 is useful when testing larger solar cells or arrays of solar cells 144. In this embodiment 110, a primary light beam 109 produced by a primary light source 112 is combined with light produced by two or more secondary sources 113, 114. In detail, the primary light beam 109 is collected and collimated by reflector 117, and directed to the solar cell 144 via optical integrator 121 and mirror 123. Light from the secondary sources 113 and 114 is selectively filtered by filters 118 and 122 to produce ultraviolet beam 156 and infrared beam 162, respectively. Note that the wavelengths of beams 156 and 162 need not necessarily be ultraviolet and infrared. The particular wavelength regions of such beams could be varied, depending on the particular primary source 112 used, as well as the desired spectral distribution of output beam 140. As with the first embodiment 10, suitable variable apertures 132 and 136 could be used to vary the intensity of the light striking lenses 126 and 126, respectively, thus varying the spectral distribution of output beam 140. Lenses 126 and 128 focus the light beams 156 and 162 onto a multifaceted mirror 141 placed in the "shadow" of boss 115 of lamp 112, thus having little or no effect on the uniformity of output beam 140. The light beams from the secondary light sources 113 and 114 pass through optical integrator 121 where they are integrated or combined with the light 109 from the primary source 112. Mirror 123 and beam converter 125 direct the output beam 140 to the surface of solar cell 144.

The primary advantage of this second embodiment 110 is that it is easier to produce an intense output beam 140 having a fairly large cross section. The maximum power, i.e., intensity over a broad area, achievable with the first embodiment is primarily limited by the power transmission capabilities of the randomized trifurcated fiber optic cable 16. This second embodiment 110 is not so restricted. However, the power handling capability of this second embodiment does come at the expense of beam uniformity. That is, currently available optical integrators, such as optical integrator 121, have a limited number of elements, typically in the range of about 30–40, which is substantially less than the 12,000 or so "elements" or fibers available with fiber optic cable 16. Consequently, while the output spectrum of this embodiment can still be accurately tailored by adjusting variable apertures 132 and 136, and while this embodiment is capable of handling relatively large amounts of power, it will not have the high beam uniformity available with the first embodiment 10.

Figure 5:
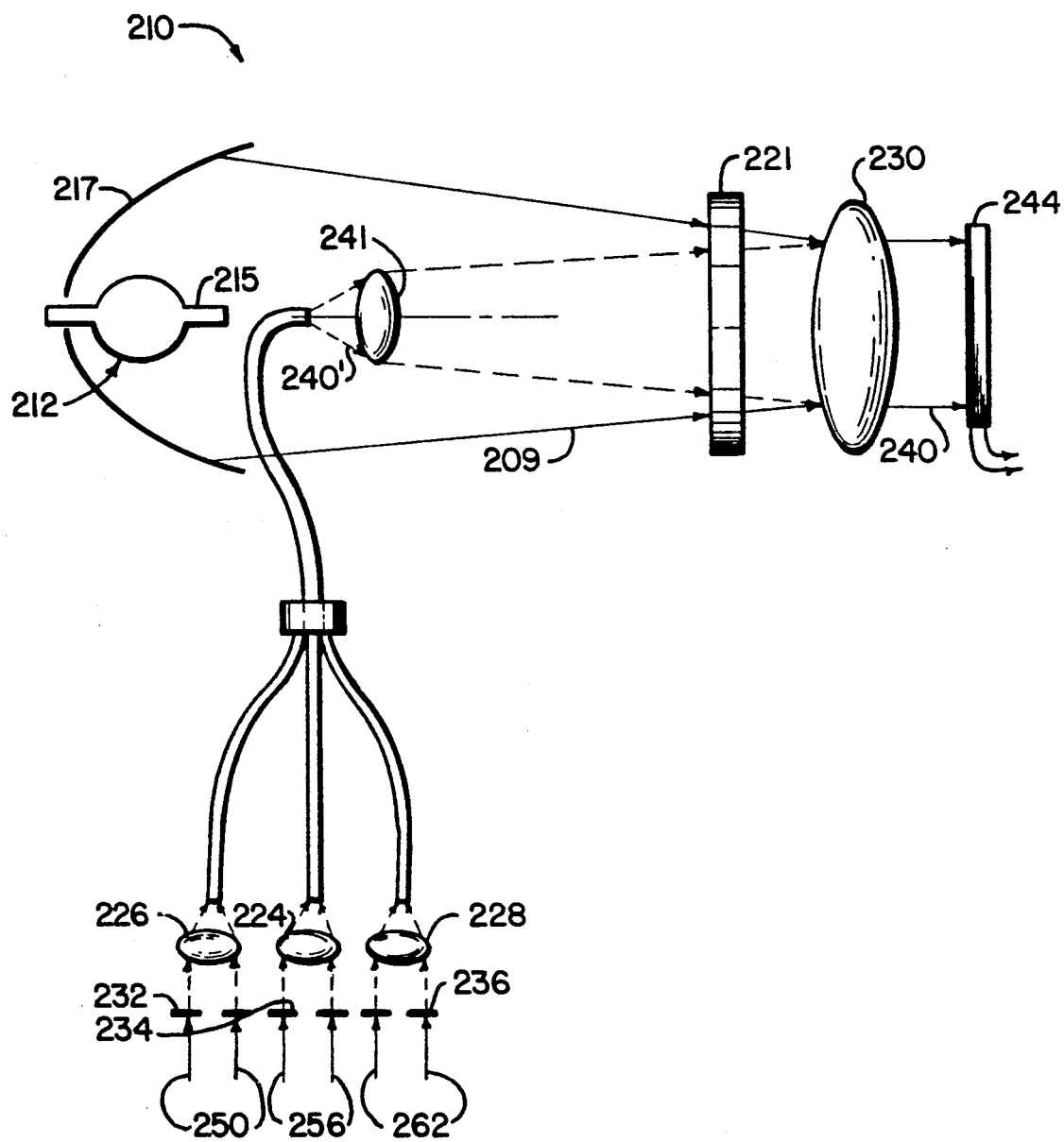
FIG. 5 is a schematic plan view of a third embodiment of the solar simulator according to the present invention using a trifurcated randomized fiber optic cable to combine light from three secondary light sources with light from a primary light source.

A third embodiment 210 of a solar simulator according to the present invention is shown in FIG. 5. This embodiment 210 is a combination of the first embodiment 10 and the second embodiment 110. In this third embodiment 210, light 209 from a primary light source 212 is combined with three individual beams 250, 256, and 262, that have been combined into a single beam 240' by a randomized, trifurcated cable 216, as described above. The output beam 240' from this cable 216 is introduced into the primary beam 209 from a point in the "shadow" of boss 215 of lamp 212, thereby minimizing any nonuniformities in output beam 240. A lens 241 focuses beam 240' onto an optical integrator 221, which integrates beam 240' with the light beam 209 produced by source 212. A collimating lens 230 collimates output beam 240 and directs it to the surface of the solar cell 244 being tested.

The primary advantage of this third embodiment 210 is that it allows relatively high intensities to be delivered to the surface of solar cell 244, while yielding better beam uniformity than the second embodiment 110. That is, the light from primary source 212 can be fairly bright or intense if it is relatively close to the desired solar spectrum Then, lower intensity "trimming" beams 250, 256, and 262 can be used to fine tune or trim the overall spectral distribution of beam 240, still producing a very accurate spectrum. Moreover, since the trimming beams 250, 256, and 262 have been uniformly combined by trifurcated fiber optic cable 16 before being combined with the light from primary source 212, the output beam 240 will have improved uniformity.

This concludes the detailed descriptions of the various embodiments. Note that throughout this description, ultraviolet, visible, and infrared have been used to refer generally to the group of wavelengths present in each of the individual light beams. It should be understood that the term "ultraviolet" as used herein, does not describe any particular wavelength of light commonly classified as ultraviolet. Rather, the term "ultraviolet" refers to an entire range of wavelengths present in the light. This definition also applies to the terms "visible" and "infrared" as used herein. Further, it should be noted that this invention is not limited to accurately reproducing solar spectra. On the contrary, the embodiments described herein could be used for myriad other purposes, such as, for example, devices for producing multicolor light signals from a single output lens or traffic signal devices.

It should also be remembered that the "coupling" inefficiencies referred to herein apply to both the so-called "front end" (i.e., from the source to the fiber optic cable) and "back end" (i.e., from the fiber optic cable to the output lens and solar cell) of the optical system. That is, any time light passes from one optical component to another, a certain amount of light is always lost in the transfer. These coupling losses make it important to reduce the number of optical components to a minimum for maximum efficiency.

Moreover, many different types of light sources could be used to produce the various light beams. Different sources having different wavelength ranges could be substituted for the sources shown and described herein depending on the desired spectral content of the output beam, as would be readily apparent to those persons having ordinary skill in this art and after becoming familiar with this invention. Further, the light paths and optical components can be arranged differently within the scope of this invention. For example, three individual light sources could be used for the first embodiment 10, rather than the two shown and described herein. Different types of filters can also be substituted to tailor the spectral distribution of the output beam to whatever shape might be desired. Further, in the second embodiment 110, an additional fourth light source could be easily added simply by adding a suitable multifaceted mirror, as would be obvious to persons having ordinary skill in this art.

While a number of specific optical components were described above for the first, second, and third embodiments 10, 110, and 210 of this invention, persons skilled in this art will readily recognize that other substitute components or combinations of components may be available now or in the future to accomplish comparable functions to make solar simulators according to this invention. Some of these possible substitutes have been mentioned throughout this description, and many more equivalents are possible. Therefore, it would be feasible to someone having ordinary skill in the art, in light of this disclosure, to assemble the necessary components to practice this invention, regardless of whether some of such components might not be the same as those described above.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as defined by the claims that follow.

The embodiments of the invention in which an exclusive property or privilege is claimed are defined as follows:

1. Solar simulator apparatus, comprising:
   first light source means for producing a first light beam having a first wavelength band;
   second light source means for producing both a second light beam having a second wavelength band and a third light beam having a third wavelength band; and
   a fiber optic cable having a first input leg, a second input leg, and a third input leg combined into a single, mixed output leg, wherein said first input leg is positioned in said first light beam, said second input leg is positioned in said second light beam, and said third input leg is positioned in said third light beam, and wherein said first input leg includes a plurality of first leg optic fibers that are optimized to transmit light having said first wavelength band, said second input leg includes a plurality of second leg optic fibers that are optimized to transmit light having said second wavelength band, and said third input leg includes a plurality of third leg optic fibers that are optimized to transmit light having said third wavelength band, said first, second, and third leg optic fibers being combined together to form said output leg in such manner that said output leg produces a substantially uniform output light beam comprising an additive mixture of the first wavelength band of the first beam, the second wavelength band of the second beam, and the third wavelength band of the third beam.

2. The solar simulator apparatus of claim 1, including collimating means positioned in said output light beam for collimating said output beam.

3. The solar simulator apparatus of claim 2, including:
   first adjustable aperture means positioned in the first light beam between said first light source and the first input leg of said randomized fiber optic cable for selectively adjusting the intensity of the first light beam before it enters the first input leg of said randomized fiber optic cable; and
   second adjustable aperture means positioned in the second light beam between said second light source means and the second input leg of said randomized fiber optic cable for selectively adjusting the intensity of the second light beam before it enters the second input leg of said randomized fiber optic cable.

4. The solar simulator apparatus of claim 3, including third adjustable aperture means positioned in the output light beam between the single output leg of said randomized fiber optic cable and said collimating means for selectively adjusting the amount of light from the output light beam before it enters said collimating means.

5. Solar simulator apparatus, comprising:
   a first light source means for producing a first light beam having a first wavelength band;
   a second light source for producing a second light beam having a second wavelength band, said second light source means including means for producing a third light beam having a third wavelength band;
   a randomized fiber optic cable having a first input leg, a second input leg, and a third input leg combined into a single output leg, wherein said first input leg is positioned in said first light beam, said second input leg is positioned in said second light beam, and said third input leg is positioned in said third light beam, and wherein said first input leg includes a plurality of first leg optic fibers, said first leg optic fibers being optimized to transmit light having said first wavelength band, said second input leg includes a plurality of second leg optic fibers, said second leg optic fibers being optimized to transmit light having said second wavelength band, and said third input leg includes a plurality of third leg optic fibers optimized to transmit light having said third wavelength band, said first, second, and third leg optic fibers being randomly combined together to form said single output leg, whereby said single output leg produces a substantially uniform output light beam comprising an additive mixture of the first wavelength band of the first beam, the second wavelength band of the second beam, and the third wavelength band of the third beam;

collimating means positioned in said output light beam for collimating said output light beam;

first adjustable aperture means positioned in the first light beam between said first light source and the first input leg of said randomized fiber optic cable for selectively adjusting the intensity of the first light beam before it enters the first input leg of said randomized fiber optic cable;

second adjustable aperture means positioned in the second light beam between said second light source means and the second input leg of said randomized fiber optic cable for selectively adjusting the intensity of the second light beam before it enters the second input leg of said randomized fiber optic cable; and third adjustable aperture means positioned in the output light beam between the single output leg of said randomized fiber optic cable and said collimating means for selectively adjusting the amount of light from the output light beam before it enters said collimating means.

6. The solar simulator apparatus of claim 5, including forth adjustable aperture means positioned in the third light beam between said second light source and the third input leg of said randomized fiber optic cable for selectively adjusting the intensity of the third light beam before it enters the third input leg of said randomized fiber optic means.

7. The solar simulator apparatus of claim 6, including:

first filter means positioned in the first light beam between said first light source and said first adjustable aperture means for selectively filtering some of said first wavelengths;

second filter means positioned in the second light beam between said second light source and said second adjustable aperture means for selectively filtering some of said second wavelengths; and third filter means positioned in the third light beam between said second light source and said forth adjustable aperture means for selectively filtering some of said third wavelengths.

8. The solar simulator apparatus of claim 7, wherein said first light source means is a filament lamp.

9. The solar simulator apparatus of claim 8, wherein said second light source means is an arc lamp.

10. A method for synthesizing a solar spectrum having a characteristic spectral distribution and irradiance intensity profile and irradiance intensity level on a wavelength versus irradiance curve, comprising the steps of:

generating a first beam of radiation that is predominately in an infrared and near infrared wavelength band;

generating a second beam of radiation that is predominantly in a visible light wavelength band;

generating a third beam of radiation that is predominately in an ultraviolet wavelength band;

adjusting the respective intensities of said first beam, second beam, and third beam in such a manner that when they are added together they produce a combination spectral distribution and irradiance intensity profile that has approximately the same shape as the spectral distribution and irradiance intensity profile of said solar spectrum;

combining said first beam, said second beam, and said third beam together into a mixed output beam that comprises a resultant additive spectral distribution and irradiance intensity profile that has approximately the same shape as the spectral distribution and irradiance intensity profile of said solar spectrum; and adjusting the resultant intensity level of said output beam to approximately the same irradiance intensity level as said solar spectrum.

11. The method of claim 10, wherein the step of combining said first beam, said second beam, and said third beam comprises the steps of:

directing said first beam into a radiation input end of a first leg of an optical fiber cable that has a first section of optical fibers, a second leg of optical fibers, and a third leg of optical fibers, each of said first, second, and third legs having a radiation input end, and a radiation output end comprising a uniform mix of output ends of said first, second, and third legs;

directing said second beam into said radiation input end of said second leg;

directing said third beam into said radiation input end of said third leg; and projecting said resultant mixed output beam from said radiation output leg of said optical fiber cable.

12. The method of claim 10, including the steps of:

generating said first beam with a first radiation source that produces predominately infrared and near infrared radiation and filtering out all other radiation that is not in the infrared and near infrared wavelength band;

generating said second and third beams with a second radiation source that produces predominately visible light and ultraviolet radiation, capturing said second beam from said second radiation source by directing a portion of the radiation produced from said second radiation source through optical components that pass visible light and exclude other radiation that is not in the visible wavelength band, and capturing said third beam from said second radiation source by directing another portion of the radiation produced from said second radiation source through optical components that pass ultraviolet and exclude other radiation that is not in the ultraviolet wavelength band.

* * * * *